United States Patent [19]

Cadeddu

[11] Patent Number: 5,144,878
[45] Date of Patent: Sep. 8, 1992

[54] HYDRAULIC ACTUATOR WITH WEAR TAKE-UP

[75] Inventor: Leonardo Cadeddu, Crema, Italy
[73] Assignee: Bendix Italia S.p.A., Crema, Italy
[21] Appl. No.: 720,291
[22] Filed: Jun. 25, 1991
[30] Foreign Application Priority Data
   Jul. 17, 1990 [IT]  Italy ................ 67549 A/90
[51] Int. Cl.⁵ .............................. F01B 7/20
[52] U.S. Cl. ......................... 91/173; 60/591; 92/13.7; 92/84; 92/114
[58] Field of Search ............. 60/572, 591; 91/173, 91/518; 92/13, 13.1, 13.3, 13.7, 80, 82, 84, 113, 114, 115

[56] References Cited

U.S. PATENT DOCUMENTS 3,004,390  10/1961  Duffy ........................ 91/173
3,171,526   3/1965  Waclawek .................. 192/111

FOREIGN PATENT DOCUMENTS 3419311  11/1972  Fed. Rep. of Germany .

*Primary Examiner*—Thomas E. Denion
*Assistant Examiner*—F. Daniel Lopez
*Attorney, Agent, or Firm*—Larry J. Palguta; Ken C. Decker

[57] ABSTRACT

A hydraulic actuator (1) with automatic wear take-up, is formed with a first piston (17) sliding in a blind bore (13), a second piston (33) in a bore made in the first piston, and an output rod (3) bearing on the second piston. A first chamber (27) is formed between the blind bore and the first piston and a second chamber (37) is formed between the bore and the second piston. A piece (19) having a shoulder (23) is fixed, on its side of smaller diameter, to an end (21) of the first piston confronting the first chamber, forming an annular space. The annular space contains an annular gasket (39) and stop (41), so as to divide the first chamber into two volumes (43, 45), one (45) connected to a pressure generator (7) and the other (43) communicating with the second chamber through a duct (47) made in the end of the first piston. The two volumes communicate with one another, at rest, via a passage provided between the gasket, the stop and the piece. When pressure in the first chamber exceeds a specific amount, communication between the two chambers is interrupted, by the shoulder coming to bear on the annular gasket.

2 Claims, 1 Drawing Sheet

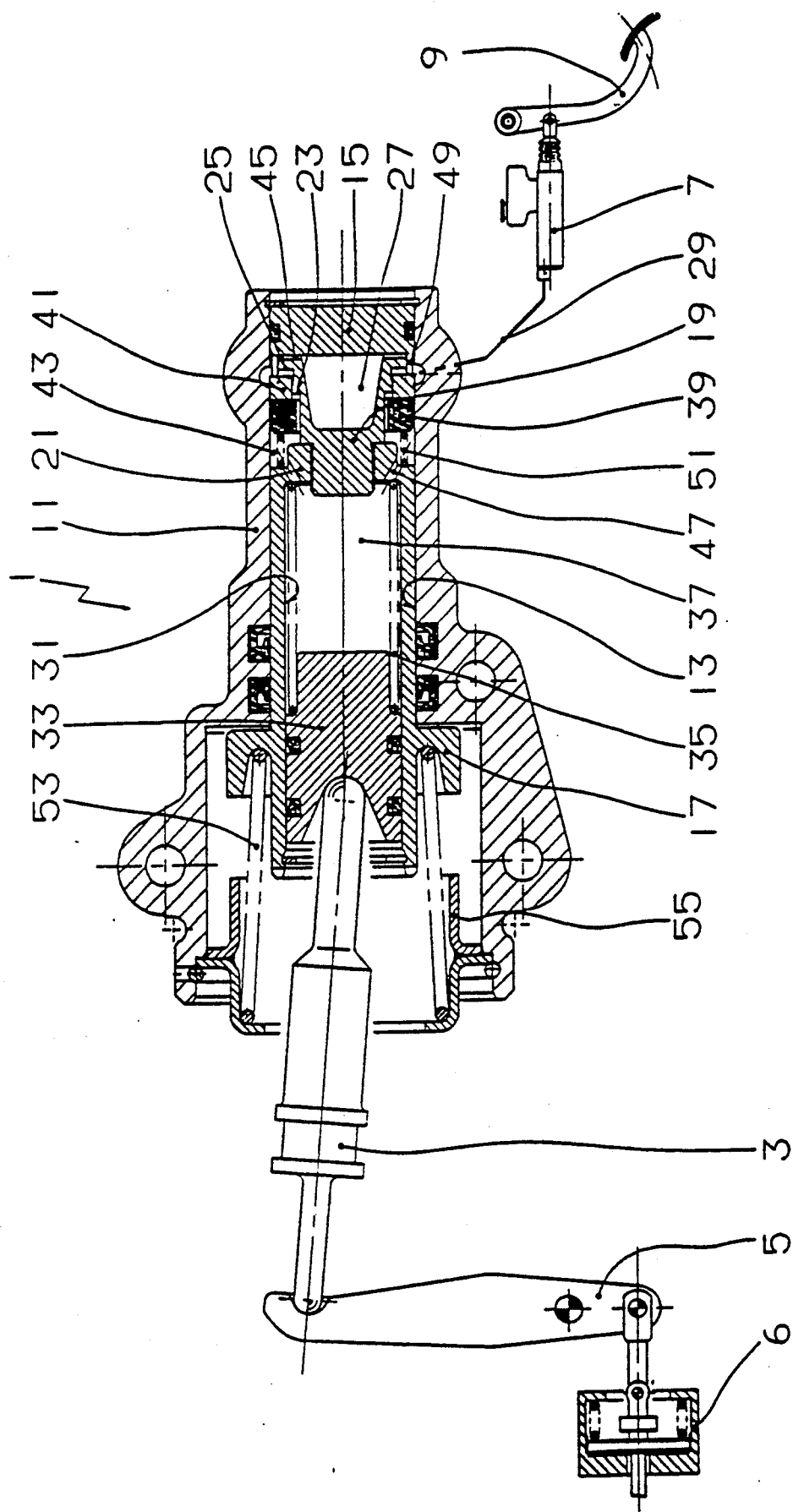

HYDRAULIC ACTUATOR WITH WEAR TAKE-UP

BACKGROUND OF THE INVENTION

The present invention relates to a hydraulic actuator with wear take-up, for example controlling a clutch of a motor vehicle.

Such an actuator with wear take-up is described, for example, in EP-A-0,310,733.

It comprises a body, in which is formed a blind bore where a first piston slides sealingly under the effect of the pressure of a fluid in a first chamber, a second piston being mounted slideably in a bore made in the first piston and an output rod bearing on said second piston, a second chamber thus being defined between the first and second pistons, a valve means being provided for ensuring hydraulic communication between the first and second chambers when the actuator is at rest and interrupting this communication when the pressure of the fluid in the first chamber is higher than a specific level.

Although operating perfectly, this actuator has the disadvantage of being difficult to bleed, especially in its second chamber.

Moreover, the valve means used in this actuator remains sensitive to the impurities contained in the fluid.

Finally, a central element is always difficult to position and adjust.

SUMMARY OF THE INVENTION

An object of the present invention is to overcome these disadvantages.

According to the invention, a piece having at least one shoulder is fixed, on its side of smaller diameter, to the end of the first piston confronting the first chamber, and an annular gasket and an annular stop of a shape complementary with this piece and movable in axial translational motion are arranged between the part of larger diameter of the piece and the end of the first piston, so as to divide the first chamber into two volumes, one being connected to a pressure generator and the other communicating with the second chamber by way of a duct made in the end of the first piston, the two volumes communicating with one another, at rest, via a passage provided between the gasket, the stop and the piece, while the passage is closed as soon as the shoulder comes to bear on the annular gasket.

Preferably, a spring arranged in the volume communicating with the second chamber returns the gasket and stop into the rest position bearing on a spacer so as to open the passage.

BRIEF DESCRIPTION OF THE DRAWING

The invention will now be described by way of example with reference to the accompanying drawing in which: the single figure shows diagrammatically, in section, an actuator according to the present invention used for a clutch control.

DETAILED DESCRIPTION OF THE INVENTION

Referring now to the figure, the actuator shown in simplified form is a clutch receiver which therefore acts on a clutch mechanism 6 by means of an output rod 3 and a lever 5.

The clutch transmitter 7 is a simple master cylinder controlled by a pedal 9.

The actuator thus comprises a body 11, in which is formed a bore 13 closed by means of a sealing plug 15. A piston 17 slides in this bore 13. A return spring 53 arranged between the body 11 and the piston 17 returns the latter to the rest position bearing on the plug 15.

The piston 17 is fixed, at its end 21 confronting the plug 15, to a piece 19 having two shoulders 23 and 25. A first chamber 27 is thus defined between the piston 17 and the plug 15, this first chamber being connected by means of a conduit 29 to the transmitter 7 forming a pressure generator for the actuating fluid which usually consists of an oil.

A blind bore 31 is made in the piston 17, and a second piston 33 slides in it. The output rod 3 bears on this second piston 33. A second chamber 37 is therefore formed inside the piston 17 between its end 21 and the piston 33 which are kept apart from one another by means of a spring 35. An annular gasket 39 and an annular stop 41 of a shape substantially complementary with that of the piece 19 and movable in axial translational motion are arranged between the shoulder 25 forming the part of larger diameter of the piece 19 and the end 21 of the piston 17. The shoulder 23 of the piece 19 is intended to be capable of coming to bear on a lateral face of the gasket 39. The annular gasket 39 and the stop 41 separate the first chamber 27 into two separate volumes 43 and 45. The volume 45 is connected permanently to the transmitter 7, while the volume 43 is connected permanently to the second chamber 37 by way of at least one duct 47.

At rest, the two volumes 43 and 45 communicate with one another via a passage provided between the gasket 39, the stop 41 and the piece 19. For this purpose, the stop 41 comes to bear, at rest, on a spacer 49 under the effect of a spring 51 arranged between the end 21 of the piston 17 and the annular gasket 39, in such a way that, at rest, the shoulder 23 of the piece 19 does not come to bear on the annular gasket 39, in order to ensure the opening of the valve.

A stop 55 is provided for limiting the stroke of the piston 17.

The actuator operates as follows. At rest, therefore, as mentioned above and as illustrated in the figure, all the chambers communicate with one another and with the transmitter 7. As the driver depresses the pedal 9, the pressure in the first chamber 27 displaces the piston 17 (to the left in the figure). The shoulder 23 of the piece 19 thereby comes to bear on the lateral face of the gasket 39, thus interrupting any communication between the two volumes 43 and 45. The second chamber 37 and the volume 43 are therefore isolated completely. A hydraulic wall is thus generated, preventing the piston 33 from moving in relation to the piston 17. The two pistons as a whole then slide under the effect of the pressure of the fluid in the volume 45. The friction of the gasket 39 on the bore 13 and the spring 51 prevent any movement of the gasket 39 and of the stop 41 as long as the shoulder 23 does not come in contact with the gasket 39.

When the pedal 9 is released, communication between the two volumes 43 and 45 is restored when the piston 17 resumes its rest position.

If there has been wear of the clutch, the output rod 3 puts the piston 33 in the appropriate position counter to the spring 35, since there is no longer any hydraulic wall at rest. The wear is therefore taken up automatically.

Bleeding becomes easy because of the ducts 47 which assist the possible evacuation of gases from the fluid.

An average person skilled in the art can make many modifications to the invention, without thereby departing from the scope of the invention, as defined by the accompanying claims.

For example, the plug 15 can be made removable for some uses.

Moreover, the stop 55 can be made adjustable for the purpose of adjusting the desired stroke of the piston 17.

What we claim is:

1. A hydraulic actuator with automatic wear take-up, comprising a body, in which is formed a blind bore where a first piston slides sealingly under the effect of the pressure of a fluid in a first chamber, a second piston being mounted slidably in a bore made in the first piston and an output rod bearing on said second piston, a second chamber being defined between said first and second pistons, valve means being provided for ensuring hydraulic communication between the first and second chambers when said actuator is at rest and interrupting the communication when the pressure of the fluid in the first chamber is higher than a specific level, a piece having at least one shoulder being fixed, on its side of smaller diameter, to an end of said first piston confronting said first chamber, and in that an annular gasket and an annular stop of a shape complementary with said piece and movable in axial translational motion being arranged between a part of larger diameter of said piece and the end of said first piston, so as to divide said first chamber into two volumes one being connected to a pressure generator and the other communicating with said second chamber by way of at least one duct made in the end of said first piston, said two volumes communicating with one another, at rest, via a passage provided between said annular gasket, said stop and said piece, while being closed as soon as said shoulder comes to bear on said annular gasket.

2. The hydraulic actuator according to claim 1, wherein a spring arranged in the volume communicating with said second chamber returns the annular gasket and stop to a rest position bearing on a spacer, so as to open said passage.

* * * * *